No. 890,420. PATENTED JUNE 9, 1908.
J. D. FREY.
NUT AND BOLT LOCK.
APPLICATION FILED NOV. 6, 1907.
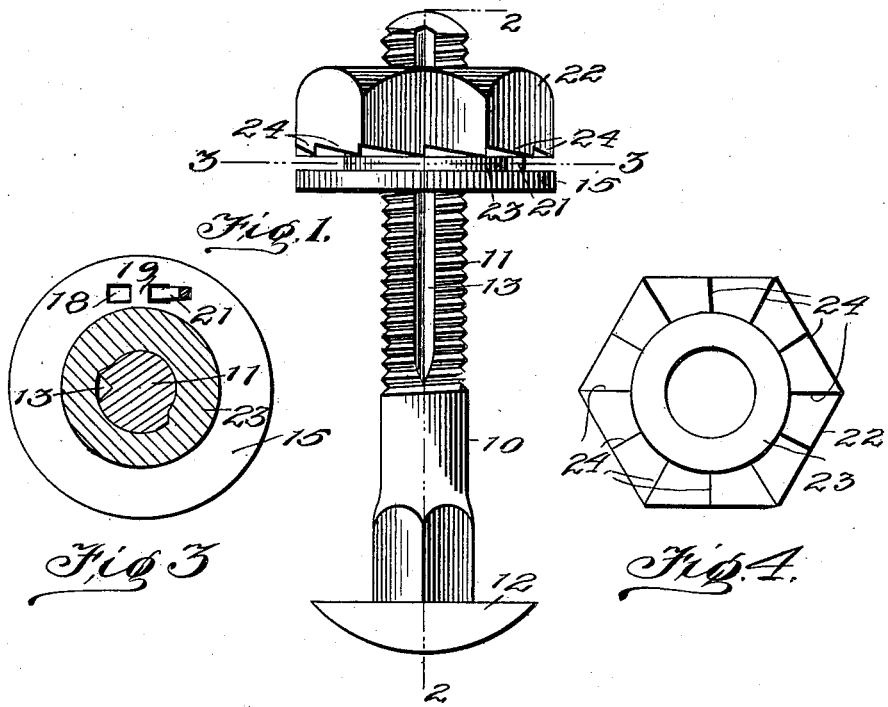
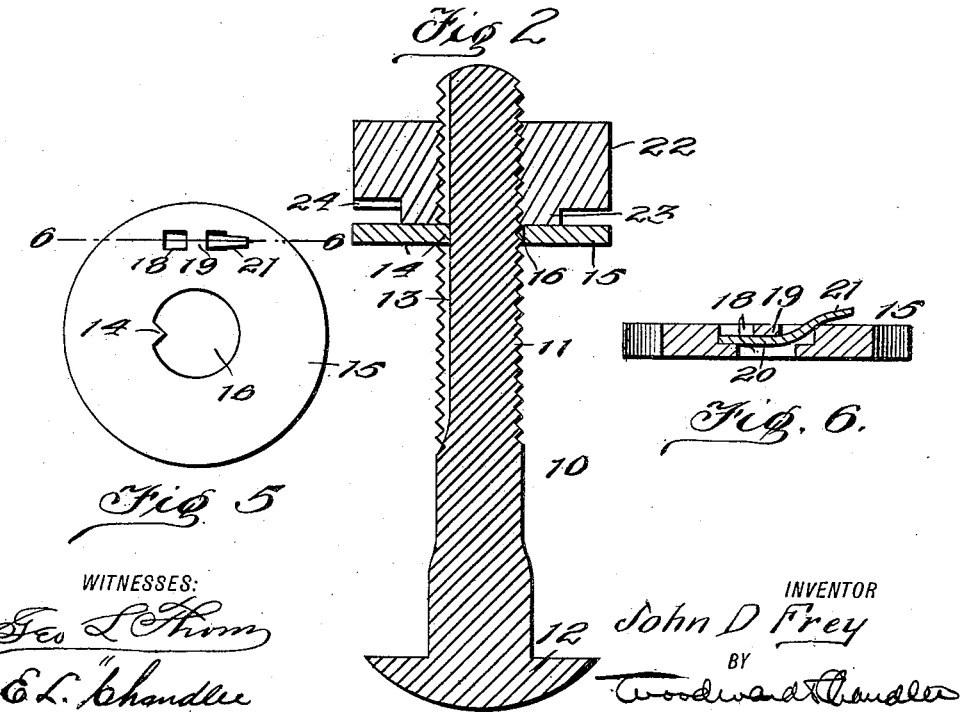
WITNESSES:
INVENTOR
John D Frey
BY
ATTORNEYS

UNITED STATES PATENT OFFICE.

JOHN D. FREY, OF CONTINENTAL, OHIO.

NUT AND BOLT LOCK.

No. 890,420.  Specification of Letters Patent.  Patented June 9, 1908.

Application filed November 6, 1907. Serial No. 400,904.

*To all whom it may concern:*

Be it known that I, JOHN D. FREY, a citizen of the United States, residing at Continental, in the county of Putnam and State of Ohio, have invented certain new and useful Improvements in Nut and Bolt Locks, of which the following is a specification.

This invention relates to the class of nut and bolt locks, and has for its object to provide a device of this character which will be simple in its structure and which will effectively serve to hold the nut to the bolt after the nut has been driven home.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a side elevational view of the present nut lock, Fig. 2 is a vertical longitudinal sectional view on the line 2—2 of Fig. 1, Fig. 3 is a cross sectional view on the line 3—3 of Fig. 1, Fig. 4 is a bottom plan view of the nut, Fig. 5 is a top plan view of the washer, Fig. 6 is a vertical longitudinal sectional view of the washer on the line 6—6 of Fig. 5.

Referring now more particularly to the drawings, there is shown a bolt 10, and this bolt is provided with the usual threaded portions 11, and a head 12. The bolt is provided with a longitudinally extending slot 13 which opens outwardly of the outer end of the bolt, as shown, and this slot is thus arranged to receive an inwardly extending finger 14 which is carried by a washer 15, the finger 14 being formed adjacent the usual opening 16 which is formed in the washer. It will thus be seen that the washer is held to the bolt against rotary movement. The washer 15, outwardly of the opening 16 is recessed to form a slot as shown at 18, and this recess is partly closed by a transversely extending bridge piece 19 spaced from the bottom of the slot. The slot 18 is thus arranged to receive a leaf spring 20 which is engaged with one end beneath the bridge piece 19, and which is provided with an upwardly curved opposite end portion 21 which is thus arranged in spaced relation to the upper face of the washer. The bridge piece 19 is thus arranged to engage the upper inner portion of the spring 20, and the spring is thus confined within the recess 18, with its inner end engaging one end wall of the slot, and the arrangement is thus such that the spring is held positively against movement through the tendency of the nut to unscrew, and is held without fastening means other than the portions of the washer described. Pins, rivets etc., which might become worn or broken are thus entirely eliminated, and a more durable structure is obtained with a less number of parts.

A nut 22 is arranged for engagement upon the threaded portion of the bolt 10 and this nut is provided upon its under side with a downwardly extending circular boss 23, and outwardly of this boss, the nut is provided with a plurality of radially extending teeth 24.

When in use, the bolt 10 is disposed in a passage in the usual manner, and the washer is disposed outwardly of the article with which the bolt is engaged with its spring 20 facing away from the head of the bolt, upon travel of the nut toward the washer, it will be seen that the spring will engage the teeth 24 of the nut 22 and thus securely hold the nut from rotation upon the bolt. By provision of the boss 23 it will be seen that a space is formed between the washer and the nut and by means of this space a tool may be inserted to disengage the spring from the teeth when it is desired to remove the nut.

What is claimed is:

1. A nut-locking device as shown and described comprising the washer 15 having the recess 18 therein and having the bridge piece 19 extending across the recess between the ends thereof and in spaced relation to the bottom of the recess, and the leaf spring 20 having one end portion engaged beneath the bridge piece and abutting at its extremity against one end wall of the recess, said leaf spring having the upwardly curved portion 21 at the opposite side of the bridge piece from the end of the recess against which the opposite extremity of the leaf spring abuts.

2. A nut-locking device comprising a washer having a recess therein at one side of and extending tangentially of the central opening of the washer, said recess terminating short of the periphery of the washer, a bridgepiece extending transversely of the recess and located between the end walls thereof, and a leaf spring engaged with one end portion in the recess and extending beneath the bridge piece and abutting at one extremity against one end wall of the recess, said leaf spring having its opposite end portions curved upwardly and outwardly of the recess and arranged for engagement of its outwardly extending extremity with a nut to be locked.

In testimony whereof I affix my signature, in presence of two witnesses.

JOHN D. FREY.

Witnesses:
 ORA RICE,
 JONATHAN BUDD.